United States Patent
Kim et al.

(10) Patent No.: US 12,381,270 B2
(45) Date of Patent: Aug. 5, 2025

(54) BATTERY PACK THERMAL EXCHANGE ASSEMBLY AND THERMAL MANAGEMENT METHOD

(71) Applicant: Ford Global Technologies, LLC, Dearborn, MI (US)

(72) Inventors: Sangyeon Kim, Northville, MI (US); Chulheung Bae, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 367 days.

(21) Appl. No.: 18/067,914

(22) Filed: Dec. 19, 2022

(65) Prior Publication Data

US 2024/0204280 A1     Jun. 20, 2024

(51) Int. Cl.
| | |
|---|---|
| *H01M 10/613* | (2014.01) |
| *H01M 10/653* | (2014.01) |
| *H01M 10/6556* | (2014.01) |
| *H01M 50/24* | (2021.01) |
| *H01M 50/507* | (2021.01) |
| *H01M 50/519* | (2021.01) |

(52) U.S. Cl.
CPC ....... *H01M 10/613* (2015.04); *H01M 10/653* (2015.04); *H01M 10/6556* (2015.04); *H01M 50/24* (2021.01); *H01M 50/507* (2021.01); *H01M 50/519* (2021.01); *H01M 2220/20* (2013.01)

(58) Field of Classification Search
CPC .......... H01M 10/613; H01M 10/6556; H01M 50/24; H01M 50/507; H01M 2220/20; H01M 10/6568
USPC ...................................................... 165/80.4
See application file for complete search history.

(56) References Cited

U.S. PATENT DOCUMENTS

| | | | |
|---|---|---|---|
| 8,231,996 B2 | 7/2012 | Howard et al. | |
| 8,597,843 B2 | 12/2013 | Yamamoto et al. | |
| 2020/0266506 A1* | 8/2020 | Stuetz | H01M 10/6568 |
| 2021/0320344 A1* | 10/2021 | Chopard | B60L 50/64 |
| 2022/0077549 A1* | 3/2022 | Erhart | H01M 10/6556 |
| 2022/0131209 A1* | 4/2022 | Bartling | H01M 10/613 |
| 2022/0393262 A1* | 12/2022 | Rosenberger | H01M 10/6556 |

FOREIGN PATENT DOCUMENTS

| | | | | |
|---|---|---|---|---|
| JP | 2006210245 A | 8/2006 | | |
| WO | WO-2021101114 A1 * | 5/2021 | .......... | H01M 50/262 |

* cited by examiner

*Primary Examiner* — Steve S Tanenbaum
(74) *Attorney, Agent, or Firm* — David B. Kelley; Carlson, Gaskey & Olds, P.C.

(57) ABSTRACT

A traction battery assembly, includes a thermal exchange frame configured to communicate a coolant that manages thermal energy levels within a traction battery pack, and an plurality of busbars held by the thermal exchange frame. A thermal management method includes moving a coolant through a thermal exchange frame to manage thermal energy levels of a battery array, and holding a plurality of busbars with the thermal exchange frame.

20 Claims, 5 Drawing Sheets

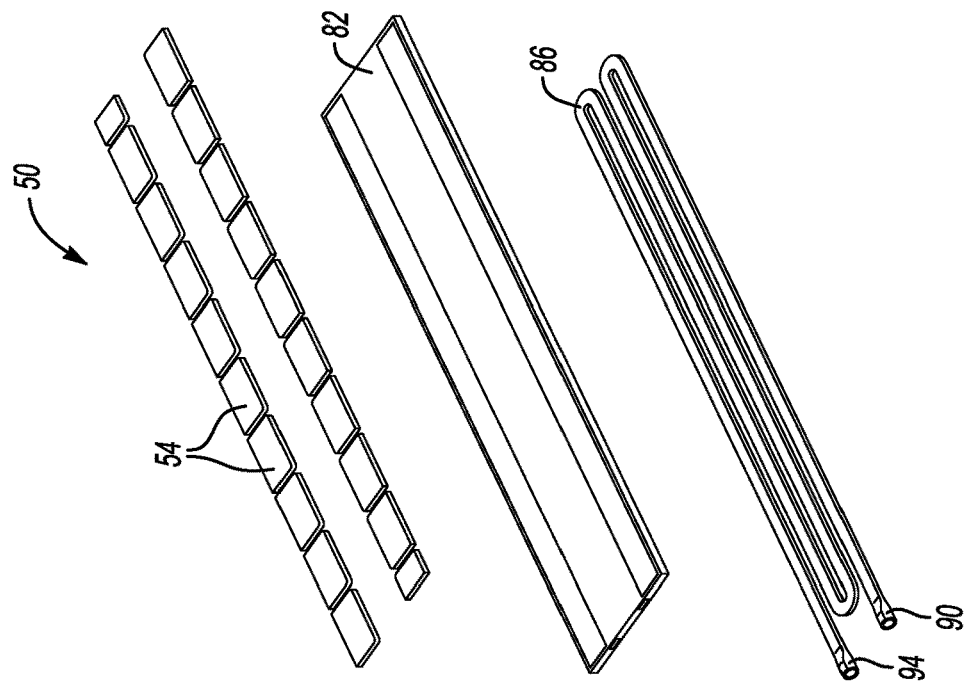
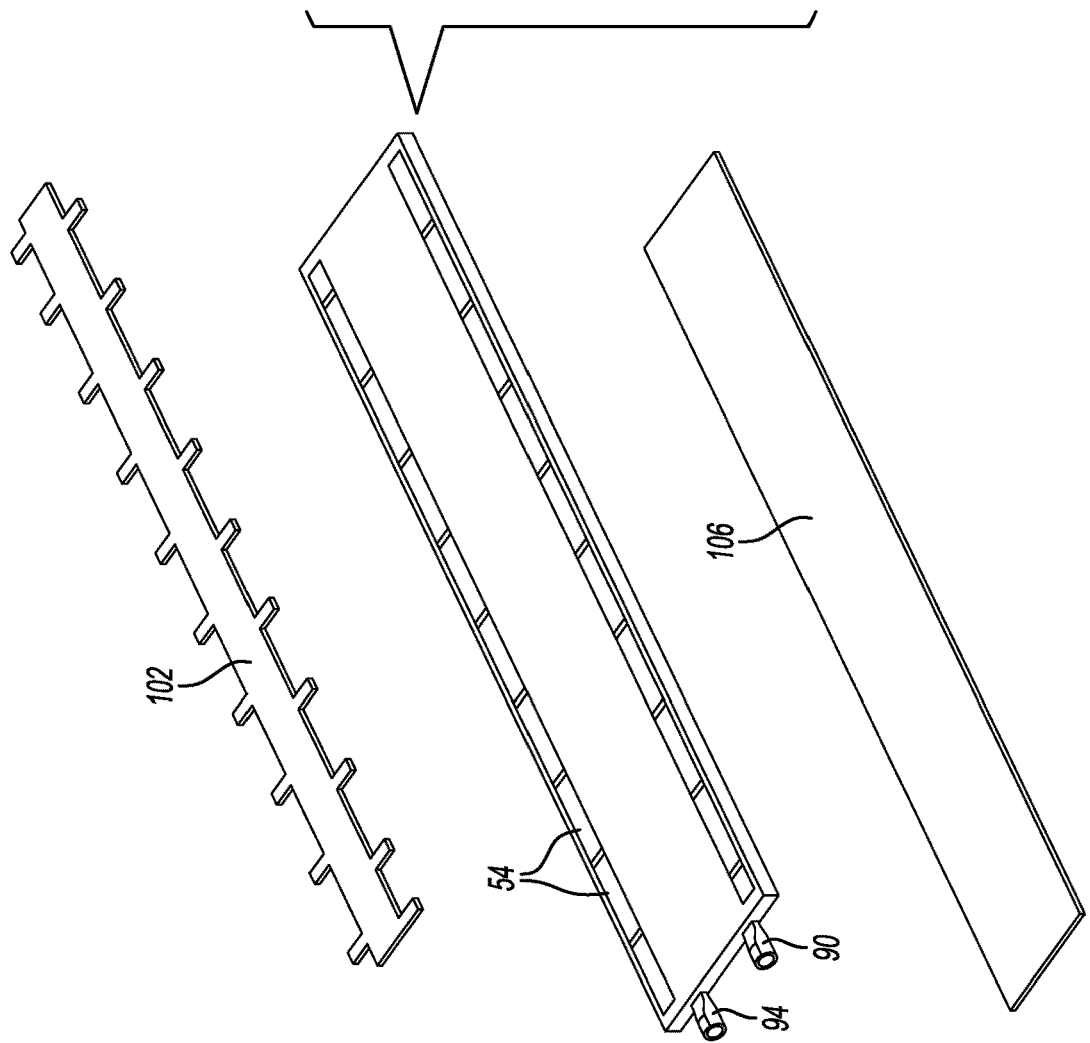
Fig-4

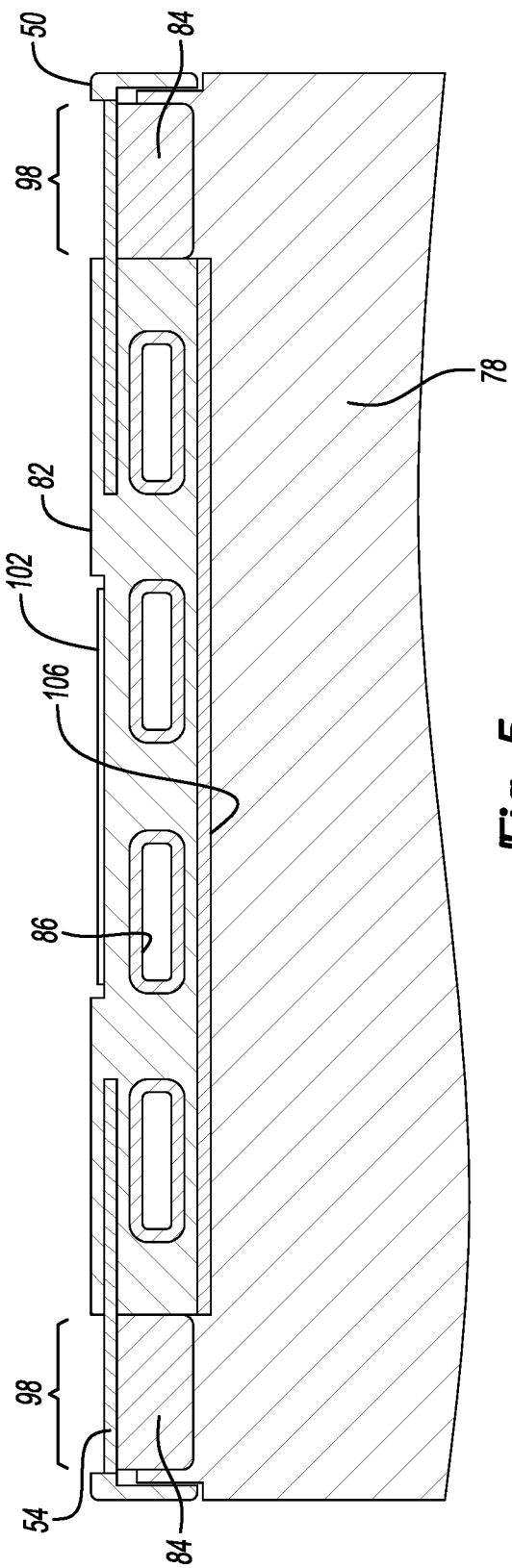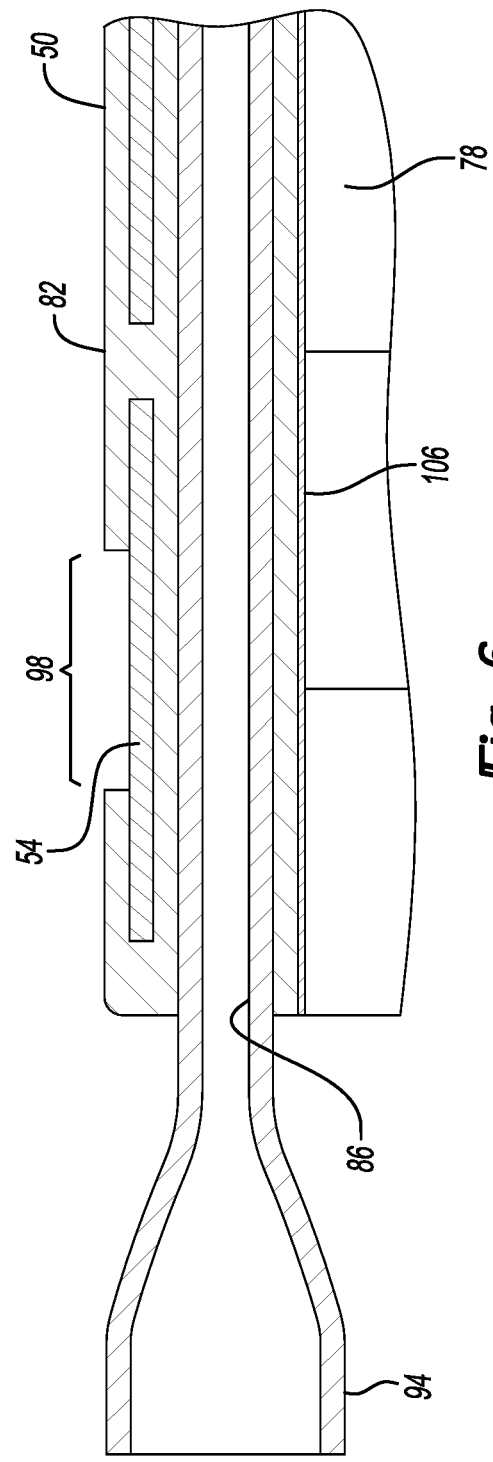

BATTERY PACK THERMAL EXCHANGE ASSEMBLY AND THERMAL MANAGEMENT METHOD

TECHNICAL FIELD

This disclosure relates generally to a thermal exchange assembly that can help to manage thermal energy levels within battery arrays and, more particularly, to a thermal exchange assembly that holds busbars.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to a traction battery assembly, including: a thermal exchange frame configured to communicate a coolant that manages thermal energy levels within a traction battery pack; and an plurality of busbars held by the thermal exchange frame.

In some aspects, the techniques described herein relate to an assembly, further including a conduit disposed within the thermal exchange frame, the conduit configured to communicate the coolant.

In some aspects, the techniques described herein relate to an assembly, wherein the thermal exchange frame is a polymer-based material.

In some aspects, the techniques described herein relate to an assembly, wherein a thermal conductivity of the polymer-based material is from 2 to 3 Watts per Meter-Kelvin.

In some aspects, the techniques described herein relate to an assembly, wherein the thermal exchange frame is insert molded to the plurality of busbars and the conduit.

In some aspects, the techniques described herein relate to an assembly, wherein the conduit is a metal or metal alloy material, wherein the thermal exchange frame is a polymer-based material.

In some aspects, the techniques described herein relate to an assembly, wherein the conduit has a rectangular cross-section.

In some aspects, the techniques described herein relate to an assembly, further including an array of battery cells that are electrically connected together with the plurality of busbars.

In some aspects, the techniques described herein relate to an assembly, wherein the thermal exchange frame communicates the coolant between the plurality of busbars and the array of battery cells.

In some aspects, the techniques described herein relate to an assembly, further including a thermal interface material layer disposed between the array of battery cells and the thermal exchange frame.

In some aspects, the techniques described herein relate to an assembly, further including a printed circuit board mounted to the thermal exchange frame.

In some aspects, the techniques described herein relate to an assembly, wherein the coolant is a liquid coolant.

In some aspects, the techniques described herein relate to an assembly, wherein the thermal exchange frame is insert molded to the busbars.

In some aspects, the techniques described herein relate to a thermal management method, including: moving a coolant through a thermal exchange frame to manage thermal energy levels of a battery array; and holding a plurality of busbars with the thermal exchange frame.

In some aspects, the techniques described herein relate to a method, further including moving the coolant through a conduit held the thermal exchange frame.

In some aspects, the techniques described herein relate to a method, wherein the thermal exchange frame is insert molded to the conduit and the plurality of busbars.

In some aspects, the techniques described herein relate to a method, wherein the conduit is a flat pipe.

In some aspects, the techniques described herein relate to a method, wherein the thermal exchange frame completely circumferentially surrounds at least a portion of the conduit.

In some aspects, the techniques described herein relate to a method, wherein the thermal exchange frame is a polymer-based material.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 4 shows a perspective and expanded view of a thermal exchange assembly from the battery array of FIG. 3.

FIG. 5 shows a section view at line 5-5 in FIG. 3.

FIG. 6 shows a section view at line 6-6 in FIG. 3.

DETAILED DESCRIPTION

This disclosure a thermal exchange assembly that can manage thermal energy levels of a battery array and also holds busbars of the battery array.

Figure 1:
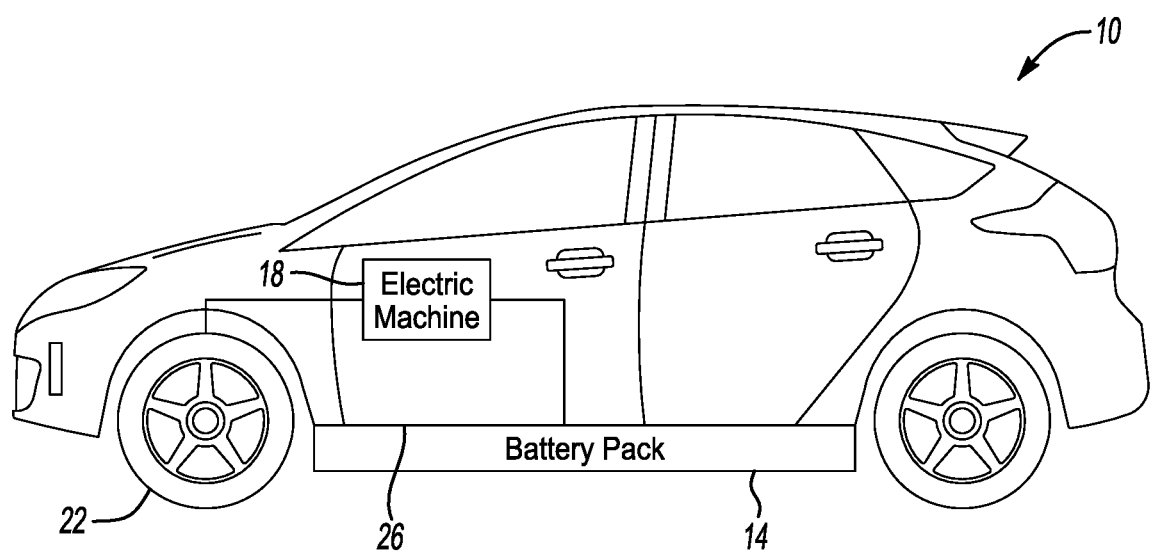
FIG. 1 shows a side view of an electrified vehicle having a traction battery pack.

With reference to FIG. 1, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery.

The traction battery pack assembly 14 is, in the exemplary embodiment, secured to an underbody 26 of the electrified vehicle 10. The traction battery pack assembly 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
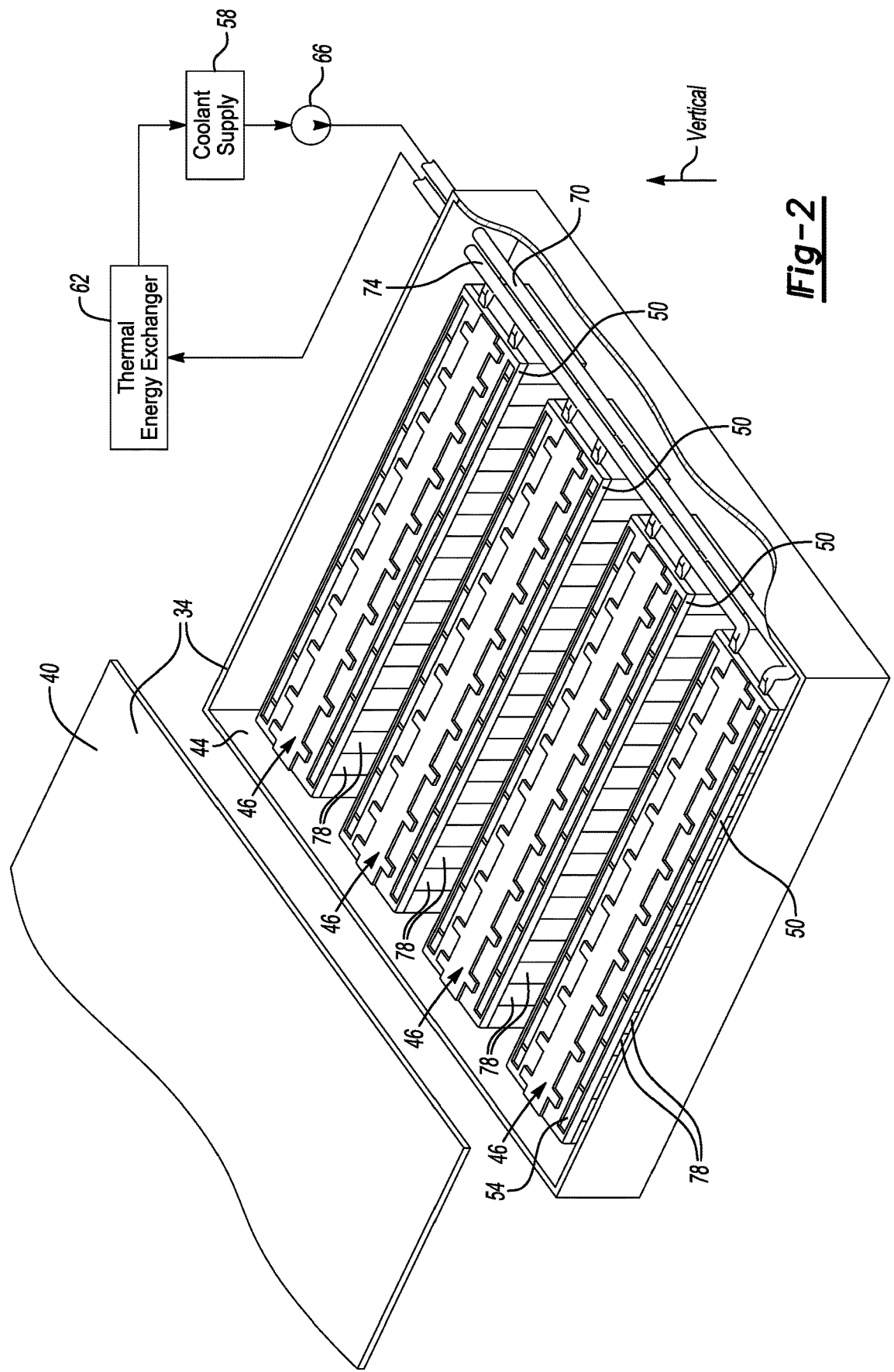
FIG. 2 shows a perspective and partially expanded view of the traction battery pack of FIG. 1.
Figure 3:
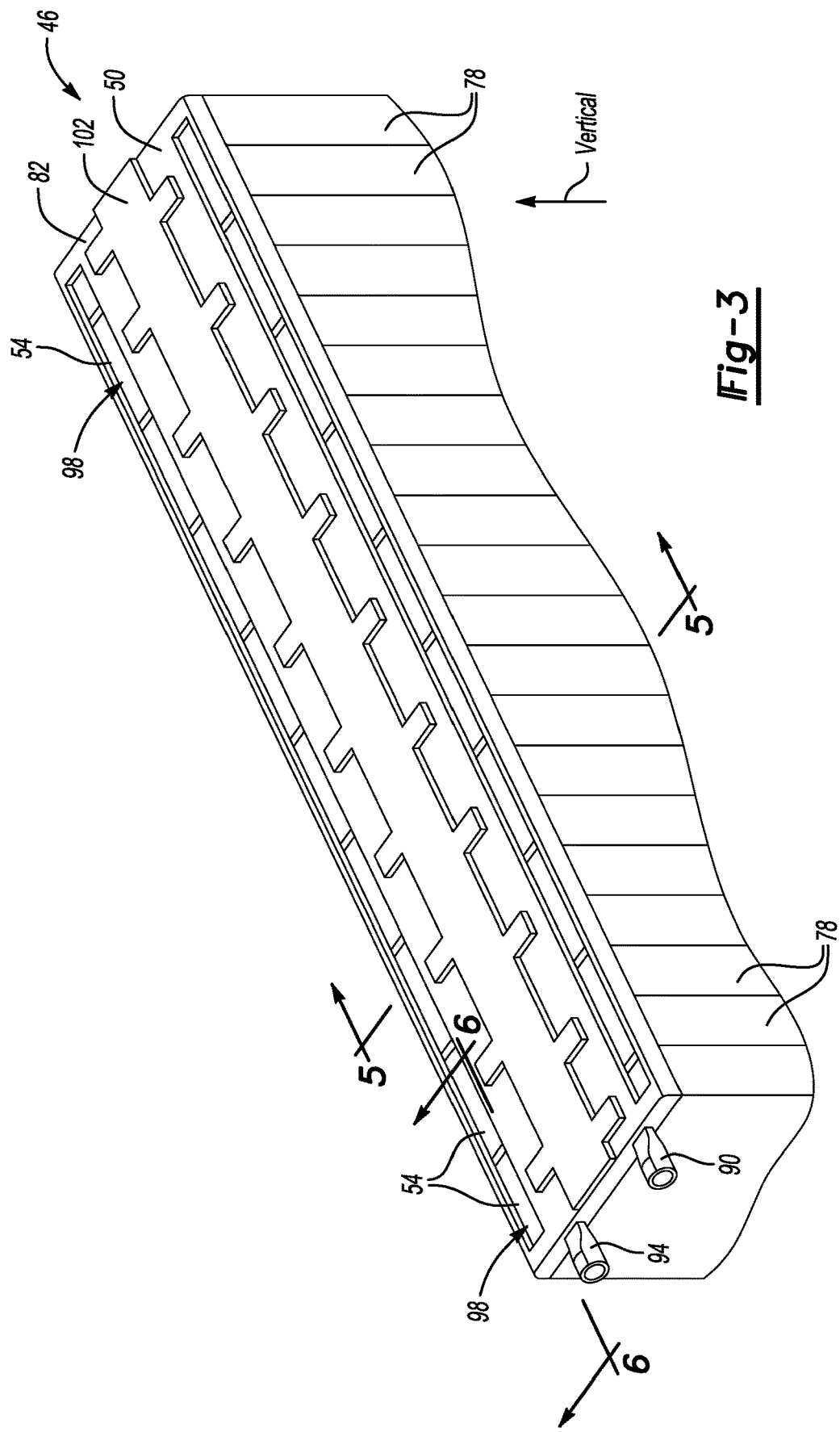
FIG. 3 shows a partial view of a battery array from the traction battery pack of FIG. 1.

With reference now to FIG. 2, the traction battery pack assembly 14 includes an enclosure assembly 34 housing a plurality of battery arrays 46. In the exemplary embodiment, the enclosure assembly 34 includes an enclosure cover 40 and an enclosure tray 44. When the enclosure assembly 34 is assembled, the enclosure cover 40 is secured to the enclosure tray 44.

In this example, four of the battery arrays 46 are housed within the enclosure assembly 34. Other numbers of battery arrays 46 could be housed within the enclosure assembly 34 in other examples. That is, the enclosure assembly 34 could house more than four battery arrays 46 or fewer than four battery arrays 46.

Each the battery arrays 46 includes a thermal exchange assembly 50 that holds a plurality of busbars 54. A coolant can be moved through the thermal exchange assembly 50 to manage thermal energy levels of the busbars and other areas of the battery arrays 46. Because the thermal exchange assembly 50 also holds busbars 54, a separate busbar holding module is not required. The thermal exchange assembly 50 is considered an interconnect busbar unit in some examples.

A coolant supply 58 and a thermal energy exchanger 62 are outside the enclosure assembly 34. A pump 66 can be used to move coolant from the coolant supply 58 into the enclosure assembly 34, through an inlet manifold 70. The inlet manifold 70 delivers the coolant to each of the thermal exchange assemblies 50. The coolant circulates through the thermal exchange assemblies to manage thermal energy levels. The coolant can, for example, take on thermal energy to cool the battery arrays 36. The coolant can be a liquid coolant.

The coolant moves from the thermal exchange assemblies 50 of the battery arrays 46 to an outlet manifold 74, which communicates the coolant to the thermal energy exchanger 62. Thermal energy can transfer from the coolant to ambient at the thermal energy exchanger 62. The coolant can move from the thermal energy exchanger 62 back to the coolant supply.

With reference now to FIGS. 3-6, within each of the battery arrays 46, the thermal exchange assembly 50 is disposed vertically atop a plurality of battery cells 78. Vertical, for purposes of this disclosure, is with reference to ground and a general orientation of the vehicle 10 during operation.

In this example, the thermal exchange assembly 50 incudes a thermal exchange frame 82 and a conduit 86 in addition to the busbars 54. The busbars 54 are held within slots of the thermal exchange frame 82.

The example conduit 86 is a coolant pipe that is at least partially embedded within the thermal exchange frame 82. In this example, the conduit 86 includes a flared inlet port 90 and a flared outlet port 94 that are not embedded within the thermal exchange frame 82, but the remaining portions of the conduit 86 are embedded within the thermal exchange frame 82.

The conduit 86 has a rectangular cross-section, which can, among other things, help to lessen a required vertical packaging space. Other than the flared inlet port 90 and the flared outlet port 94, the thermal exchange frame 82 completely surrounds the conduit 86. In another example, the conduit 86 is received within a slot of the thermal exchange frame 82 and is exposed on a vertically downward facing side.

Coolant is moved through the conduit 86 to manage thermal energy levels of the associated battery array 46. The coolant can carry thermal energy from the associated battery array 46 to cool the associated battery array 46, for example.

Another thermal exchange assembly could be placed vertically beneath the plurality of battery cells 78. Coolant could circulate through this thermal exchange assembly as well such that the battery cells 78 of the battery arrays 46 are sandwiched between the two thermal exchange assemblies that can each convey coolant.

The example thermal exchange frame 82 is a polymer-based material. The material of the thermal exchange frame 82 can have a thermal conductivity that is from 2 to 3 Watts per Meter-Kelvin, which can facilitate thermal energy transfer.

The busbars 54 and the conduit 86 are, in this example, a metal or metal alloy. In this specific example, the busbars 54 are copper and the conduit 86 is aluminum.

The example conduit 86 is a pipe that is separate from the thermal exchange frame 82. The pipe defines a circumferential boundary for the coolant, and the coolant directly contacts the pipe. In another example, the pipe is omitted and the conduit 86 is a passageway within the thermal exchange frame 82. In such an example, the thermal exchange frame 82 defines the circumferential boundary for the coolant, and the coolant directly contacts the thermal exchange frame.

The thermal exchange frame 82 is insert molded to the busbars 54 and the conduit 86 in this example. The thermal exchange frame 82 is a single, unitary structure. In another example, multiple separate structures provide the thermal exchange frame.

That the thermal exchange assembly 50 includes the thermal exchange frame 82 insert molded to the busbars 54 and the conduit 86 implicates structure to the thermal exchange assembly 50. A person having skill in this art would be able to structurally distinguish components that are insert molded from other types of assemblies, such as assemblies having components that are established separately from one another and secured together in an assembly.

The thermal exchange frame 82 is insert molded such that the busbars 54 are sandwiched between portions of the thermal exchange frame 82. The busbars 54 include exposed portions 98 that faces vertically upward. Other busbars (not show) can contact the exposed portions 98 to electrically connect to the busbars 54.

The battery cells 78 each include a pair of terminals 84. The busbars 54 are electrically coupled to the terminals 84 of selected battery cells 78. The terminals 84 can extend upward through the thermal exchange frame 82 to contact the terminals 84. The battery cells 78 are prismatic battery cells in this example. Other types of battery cells 78 could be used in other examples.

In addition to the busbars 54 and the conduit 86, the example thermal exchange frame 82 holds a flexible printed circuit board 102. Temperature and voltage sensing can be carried out using the flexible printed circuit board 102. The flexible printed circuit board 102 is mounted to the thermal exchange frame 82.

Further, to enhance thermal energy transfer, a thermal interface material layer 106 is sandwiched between the battery cells 78 and part of the thermal exchange frame 82. The thermal interface material layer 106 is disposed between the terminals 84.

Features of the disclosed examples include a thermal exchange device that can communicate a coolant to manage thermal energy levels within a battery array. The thermal exchange device can hold busbars. The thermal exchange device can include a flat coolant pipe, which can help to reduce packaging space.

The battery cells of the battery array can be placed between the thermal exchange device and another thermal exchange device to provide even more thermal management, which may be beneficial particularly during a DC fast-charge.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery assembly, comprising:
a thermal exchange frame configured to communicate a coolant that manages thermal energy levels within a traction battery pack; and
a plurality of busbars held by the thermal exchange frame.

2. The assembly of claim 1, further comprising a printed circuit board mounted to the thermal exchange frame.

3. The assembly of claim 1, wherein the thermal exchange frame is insert molded to the busbars.

4. The assembly of claim 1, wherein the thermal exchange frame is configured to communicate the coolant without any coolant contacting the busbar.

5. The assembly of claim 1, wherein the thermal exchange frame directly contacts the plurality of busbars.

6. The assembly of claim 1, further comprising an array of battery cells that are electrically connected together with the plurality of busbars, wherein the thermal exchange frame communicates the coolant between the plurality of busbars and the array of battery cells.

7. The assembly of claim 6, further comprising a thermal interface material layer disposed between the array of battery cells and the thermal exchange frame.

8. The assembly of claim 1, further comprising a conduit disposed within the thermal exchange frame, the conduit configured to communicate the coolant without the coolant contacting any of the busbars within the plurality of busbars.

9. The assembly of claim 8, wherein the thermal exchange frame is a polymer-based material; and wherein a thermal conductivity of the polymer-based material is from 2 to 3 Watts per Meter-Kelvin.

10. The assembly of claim 8, wherein the thermal exchange frame is insert molded to the plurality of busbars and the conduit.

11. The assembly of claim 8, wherein the conduit is a metal or metal alloy material, wherein the thermal exchange frame is a polymer-based material.

12. The assembly of claim 8, wherein the conduit has a rectangular cross-section and extends circumferentially continuously about the coolant.

13. The assembly of claim 8, wherein the thermal exchange frame extends circumferentially continuously about the conduit.

14. The assembly of claim 8, wherein the thermal exchange frame includes a portion disposed between the plurality of busbars and the conduit.

15. A thermal management method, comprising:
moving a coolant through a thermal exchange frame to manage thermal energy levels of a battery array; and
holding a plurality of busbars with the thermal exchange frame.

16. The method of claim 15, wherein the thermal exchange frame directly contacts the plurality of busbars.

17. The method of claim 15, further comprising moving the coolant through a conduit held by the thermal exchange frame without the coolant contacting the plurality of busbars.

18. The method of claim 17, wherein the thermal exchange frame is insert molded to the conduit and the plurality of busbars.

19. The method of claim 17, wherein the conduit is a flat pipe that circumferentially surrounds the coolant moving through the thermal exchange frame.

20. The method of claim 17, wherein the thermal exchange frame completely circumferentially surrounds at least a portion of the conduit.

* * * * *